US008806195B2

(12) United States Patent
Wnuk et al.

(10) Patent No.: US 8,806,195 B2
(45) Date of Patent: Aug. 12, 2014

(54) USER INTERFACE GENERATION IN VIEW OF CONSTRAINTS OF A CERTIFICATE PROFILE

(75) Inventors: Andrew Wnuk, San Jose, CA (US); Christina Fu, Saratoga, CA (US)

(73) Assignee: Red Hat, Inc., Raleigh, NC (US)

( * ) Notice: Subject to any disclaimer, the term of this patent is extended or adjusted under 35 U.S.C. 154(b) by 555 days.

(21) Appl. No.: 12/714,274

(22) Filed: Feb. 26, 2010

(65) Prior Publication Data
US 2011/0213961 A1    Sep. 1, 2011

(51) Int. Cl.
H04L 29/06 (2006.01)
H04L 9/32 (2006.01)

(52) U.S. Cl.
USPC ........... 713/156; 713/150; 713/155; 713/157; 713/175

(58) Field of Classification Search
USPC .................................. 713/150, 155–156, 175
See application file for complete search history.

(56) References Cited

U.S. PATENT DOCUMENTS

2003/0078949 A1*  4/2003  Scholz et al. ................. 707/505

OTHER PUBLICATIONS

"Red Hat Certification System 7.1: Administrator's Guide," Red Hat Inc., Sep. 2005, 27 pages.*
"Red Hat Certification System 7.3: Administrator's Guide," Red Hat Inc., May 2007, 137 pages.*
"Active Directory Certificate Server Enhancements in Windows Server 'Longhorn'," Microsoft Corporation, Sep. 2006, 93 pages.*
"Red Hat Certificate System 8.0 Administration Guide," Red Hat, Inc., Jan. 2009, 552 pages.*
Red Hat Certificate System 8.0, Admin Guide, Jul. 22, 2009, Updated Sep. 9, 2009, 81 pages.

* cited by examiner

*Primary Examiner* — Carl Colin
*Assistant Examiner* — John Elmore
(74) *Attorney, Agent, or Firm* — Lowenstein Sandler LLP

(57) ABSTRACT

User interface generation in view of constraints of a certificate profile is described.

25 Claims, 5 Drawing Sheets

USER INTERFACE GENERATION IN VIEW OF CONSTRAINTS OF A CERTIFICATE PROFILE

TECHNICAL FIELD

Embodiments of the invention relate to the field of identity management systems, and more particularly, to dynamic user interface generation based on constraints of a certificate profile.

BACKGROUND

Identity management systems are information systems that support the management of identities. In particular, an identity management system establishes the identity of a subject or an object by linking a name (or number) with the subject or object. The identity management system may also describe the identity, for example, by assigning one or more attributes applicable to the particular subject or object to the identity. The identity management system may also modify the identity, such as by linking a new or additional name, or number, with the subject or object and/or change one or more attributes applicable to the particular subject or object. The identity management system can record and/or provide access to logs of activity by the identity.

One of the cornerstones of establishing a secure network environment is making sure that access is restricted to people who have the right to access the network. This access is allowed when the user can authenticate to the identity management system, meaning the user can verify his identity. The authentication may be managed by a public key infrastructure (PKI), such as implemented by a certificate system. For PKI, users and machines may present digital certificates to verify their identity. A digital signature is a mathematical representation of a message, using public key cryptography, which identifies the originator of the message, in a non-forgeable manner. Public key cryptography requires the use of two mathematically related keys—a public key and a private key (collectively referred to as a key pair). The private key is kept private by a single owner, and is not distributed to anyone else. The owner uses his or her private key, in conjunction with cryptographic algorithms, to digitally sign a message. The public key is made public, and can be used by anyone to verify the digital signature on a message. The fact that these two keys are mathematically related ensures that only a single private key can generate a digital signature that is verifiable by the corresponding public key, making the digital signature unforgeable. A digital certificate, commonly referred to as a certificate, is an electronic document used to identify an individual, a server, a company, or another type of entity and to associate that identity with a public key. The digital certificate binds a person's identity to his or her public key, and consequently, to his or her private key, and may be used to verify digital signatures. Digital certificates and digital signatures then provide the foundation for secure transactions over a network, such as the Internet.

Certificate authorities (CAs) validate identities and issue certificates. CAs can be either independent third parties or organizations running their own certificate-issuing server software, such as a certificate system. Before issuing a certificate, a CA must confirm the user's identity with its standard verification procedures. The certificate issued by the CA binds a particular public key to the name of the entity identified by the certificate. In addition to the public key, the certificates include the name of the entity it identifies, an expiration date, and the name of the CA that issued the certificate.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
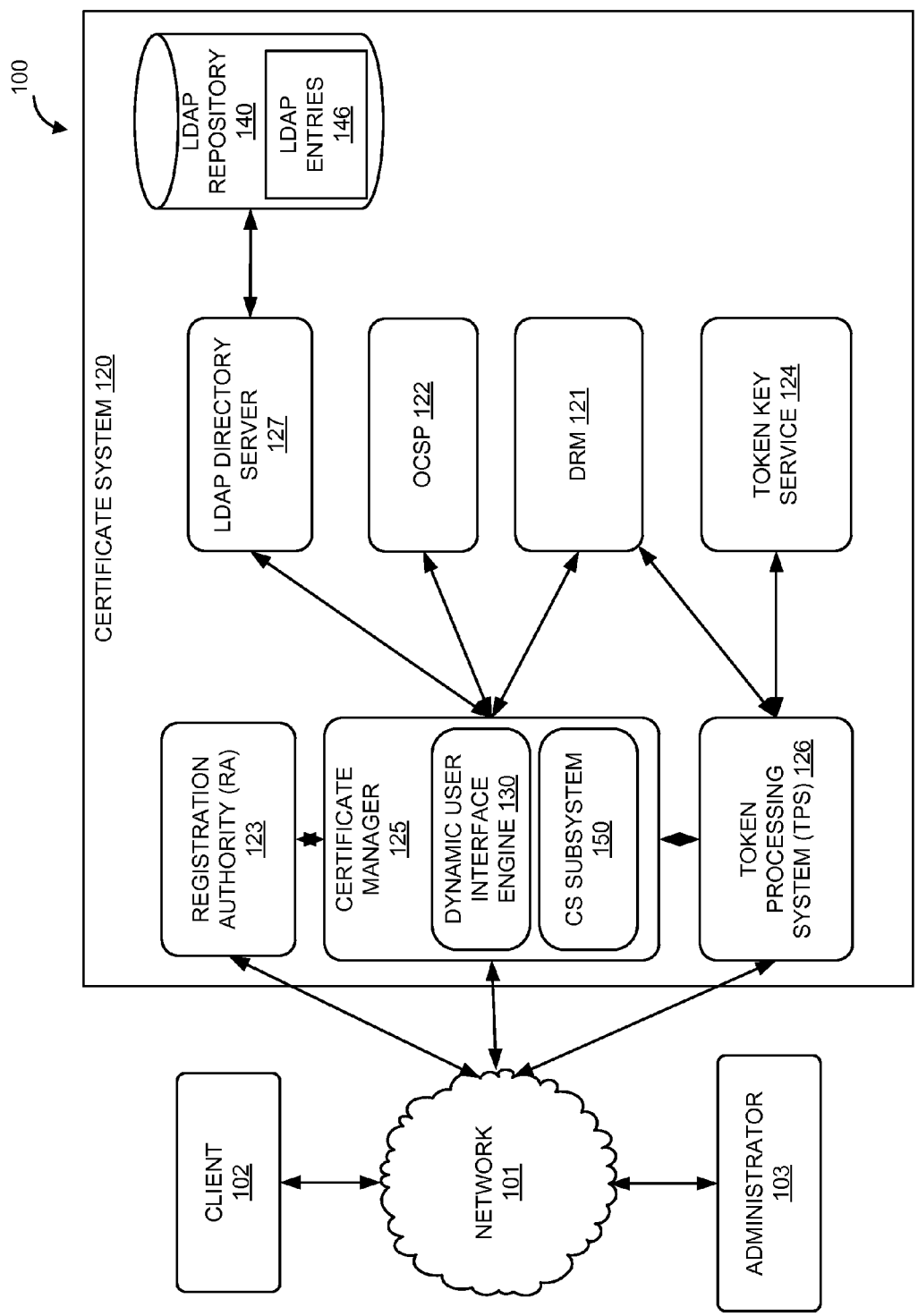
FIG. 1 is a block diagram of exemplary system architecture in which embodiments of a certificate system, having a dynamic user interface engine, may operate.

A method and system for dynamic user interface generation based on constraints of a certificate profile is described. In one embodiment, a method includes receiving user input that selects one of multiple certificate profiles for requesting a certificate. Each of the certificate profiles defines a set of one or more defaults of the certificate's contents and a set of one or more constraints for values associated with the certificate's contents contained in the certificate. The method further includes dynamically generating an enrollment page with a profile enrollment form using the set of defaults and the set of constraints associated with the selected certificate profile, and presenting the enrollment page with the profile enrollment form to a user.

Embodiments of the present invention provide an improved certificate system. By dynamically generating the enrollment forms based on constraints of the certificate profile, the certificate system can eliminate or reduce the number of enrollment requests received from requesters that violate one or more of the constraints of the selected certificate profile. The embodiments may also provide a more flexible certificate system that allows an administrator create or modify certificate profiles to have one or more constraints that drive what information is presented to the user as part of the enrollment page. This allows the user interface to be tailored to allow the user to select or input values that are within the constraints set by the certificate profile. The administrator can subsequently modify these constraints or create new constraints, and the embodiments dynamically generate the enrollment page with the updated constraints without requiring a new enrollment page to be specifically designed to accommodate such changes.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "presenting," "allowing," "excluding," "approving," "authenticating," "processing," "computing," "calculating," "determining," "displaying," or the like, refer to the actions and processes of a computer system, or similar electronic computing systems, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system specifically programmed by a computer program stored in the computer system. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary system architecture 100 in which embodiments of a certificate system 120, having a dynamic user interface engine 130, may operate. The architecture 100 includes a client workstation 102, an administrator workstation 103 and a certificate system 120, each coupled to the network 101 that communicates any of the standard protocols for the exchange of information. The network 101 may be a Local Area Network (LAN) and may be incorporated into the same physical or logical system, or different physical or logical systems. Alternatively, the certificate system 120 and client 102 may reside on different LANs that may be coupled together via the Internet but separated by firewalls, routers, and/or other network devices. Alternatively, the network 101 may represent other types of public or private networks or any combination thereof, such as an intranet, an extranet, a cellular network, the Internet, or any combination thereof. The network connections may be LAN connections, Internet connections, Wi-Fi connections, 3G connections, or the like, and may use various types of protocols to communicate data to and from the certificate system 120, administrator workstation 103 and the client workstation 102.

The certificate system 120 may be hosted on one or more machines including one or more server computers, gateways or other computing systems. In one embodiment, the certificate system 120 resides on multiple servers, including a CA server that hosts the certificate manager 125, and the end users and/or agents on the client 102 can interact with the certificate system 120 via web browser applications on the client 102. It should be noted that various other network configurations can be used including, for example, hosted configuration, distributed configurations, centralized configurations, etc. The certificate system 120 includes various certificate system subsystems, including a key recovery authority 121, sometimes called a data recovery manager (DRM), an online certificate status responder (OCSP) 122, a Lightweight Directory Access Protocol (LDAP) directory server 127, the token key system (TKS) 124, a certificate manager 125, and the token processing system (TPS) 126.

The certificate manager 125 may operate as a CA that can issue, renew, revoke, and publish a wide variety of certificates, for servers, for users, for routers, for other subsystems, and for file or object signing. The certificate manager 125 can be implemented as software, hardware, firmware or any combination thereof. The certificate manager 125 is the core of a CA's Public Key Infrastructure (PKI). The PKI is a set of hardware, software, people, policies, and procedures needed to create, manage, distribute, use, renew, and revoke digital certificates. The certificate manager 125 can also compile and publish certificate revocation lists (CRLs). The certificate manager 125 may be structured in series with other certificate managers 125. The certificate manager 125, which is sometimes referred to as the CA server, can establish and maintain relationships between other subsystems of the certificate system 120. In one embodiment, the certificate manager 125 includes a dynamic user interface engine 130 and a CS subsystem 150. The operations of dynamic user interface engine 130 and CS subsystem 150 are described below.

Certificates are created based on a specific, unique key pair. If a private key is ever lost, then the data that can be accessed using the key (such as encrypted emails) is also lost because it is inaccessible. The DRM 121 stores key pairs, so that in case a token is lost or broken, the keys can be recovered and the certificates can be retrieved and restored on the token. The token may be a physical device that an authorized user of computer services is given to ease authentication. Tokens can store a certificate that is used for authenticating the identity of the owner. For example, when a user inserts a smart card into a system, the smart card presents the certificates to the system and identifies the user so the user can be authenticated over the network.

The OCSP 122 verifies whether a certificate is valid and not revoked. The certificate manager 125 can have an internal OCSP service to perform this function, but using an external OCSP eases the load on the issuing CA (certificate manager 125). The certificate system 120 may also include a registration authority (RA) 123, which accepts certificate requests and verifies, independently, whether that request should be approved. It then forwards approved requests to the certificate manager 125 to issue the certificate. Like the OCSP, this is a function that can be performed by the certificate manager 125, but using a separate subsystem reduces the load on the certificate manager 125.

The TKS 124 derives keys based on token identifier information, private information, and/or a defined algorithm. These derived keys are used between the token and the TKS 124 to provide a secure channel that allows operations, such as to format tokens and enroll tokens to be processed securely. The TPS 126 interacts directly with external tokens, like the smart card on a client device, and manages the keys and certificates on those tokens through an interface on the client device. The interface contacts the TPS 126 when there is a token operation, and the TPS 126 interacts with the certificate manager 125, DRM 121, or TKS 124, as required, then sends the information back to the token via the interface.

Figure 2:
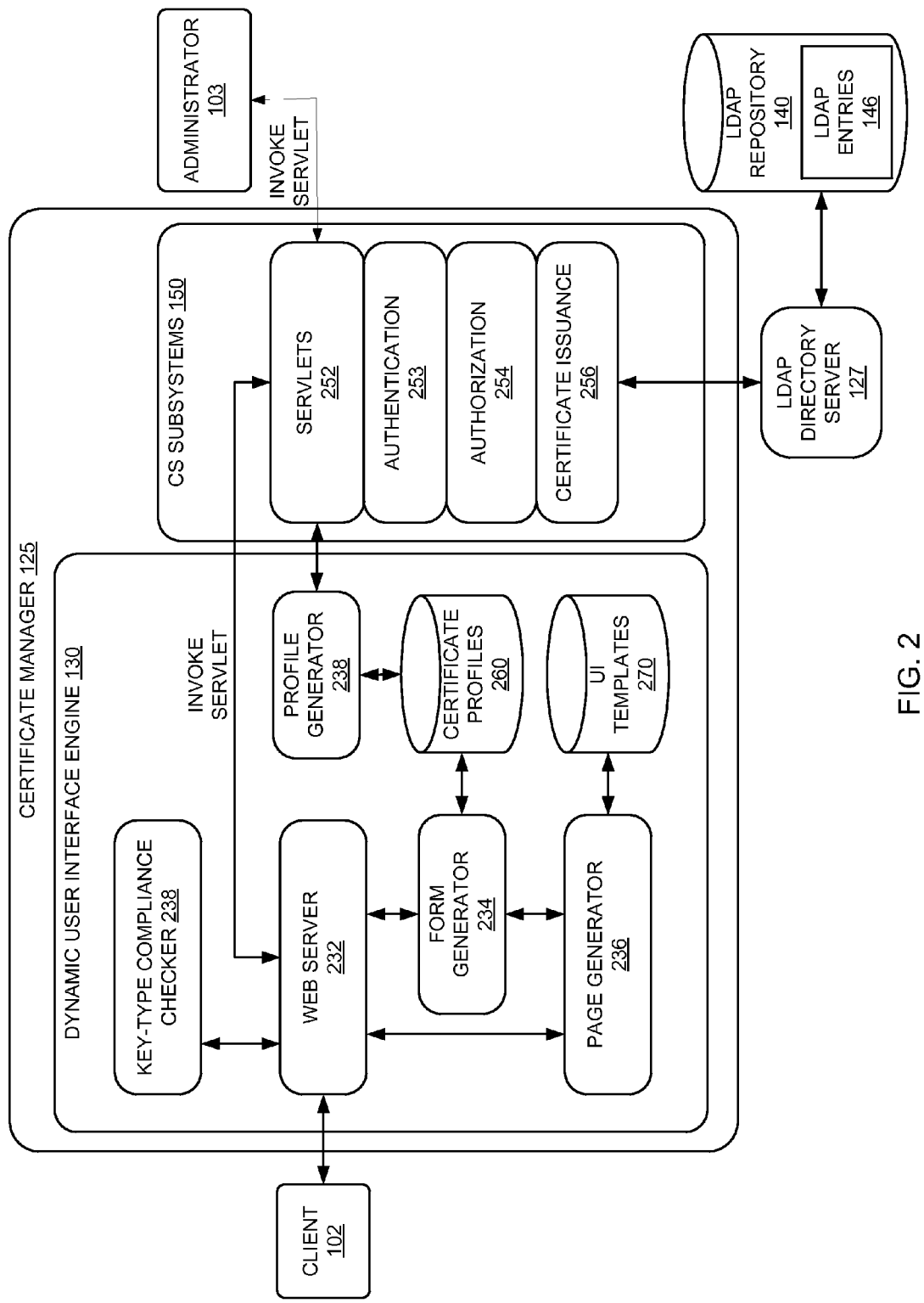
FIG. 2 is a block diagram of one embodiment of the dynamic user interface engine of FIG. 1.

The certificate system 120 includes a CA database. The CA database may be implemented, for example, using various types of database technologies. In one embodiment, as depicted in FIGS. 1 and 2, the certificate system 120 implements the CA database using a Lightweight Directory Access Protocol (LDAP) directory server 127 that manages LDAP entries 146 stored in the LDAP repository 140. The LDAP directory server 127 may be one or more machines including one or more server computers, gateways or other computing systems. LDAP is a set of open protocols used to access centrally stored information over a network. LDAP organizes information in a hierarchical manner using directories. These directories can store a variety of information and can enable access to the information from any machine on the LDAP enabled network. In other embodiments, the LDAP entry 146 may contain along with the original certificate, the certificate profile used to enroll the original certificate, its public key, the subject DN, the original certificate request, the original certificate's extension, etc., for example. The certificate profile includes a set of rules concerning the issuing of a certificate by the certificate manager 125, for example, the kind of content that is required to submit the request, the way the request is processed and approved (authenticated and authorized), the information that is included in the certificate content, and how long the certificate is valid. In other embodiments, the LDAP entry 146 may contain, along with the original certificate, an original enrollment profile used to enroll the original certificate, its public key, the subject DN, the enrollment request for the original certificate, the original certificate's extension, for example. The original certificate request entry may also contain the original validity period of the certificate and the grace period for renewing the certificate. The grace period is the time before and after the expiration date when renewal is allowed. Alternatively, the CA database may be stored on other types of data storage devices that store records of digital certificates in the CA database.

The client 102 and administrator 103 workstations may each be a personal computer (PC), such as a laptop or desktop computer, a tablet PC, a set-top box (STB), a gaming system, a portable electronic device, such as a mobile phone, personal digital assistant (PDA), wireless terminal, portable gaming system, or another wireless electronic device. In one embodiment, an administrator on the administrator workstation 103 configures the certificate profiles used by the dynamic user interface engine 130. The administrator workstation 103 may provide web-browsing capabilities to render images, documents, etc., in a web browser using uniform resource locators (URLs) or links specified by the administrator (e.g., by activating a link). The web browser allows an administrator to access an administrator console provided by the certificate system 120. The administrator console can allow the administrator to configure the dynamic user interface engine 130 and/or the CS subsystem 150. The administrator workstation 103 can use the management user interface (UI) for management of the certificates. In one embodiment, the administrator workstation 103 can access the management UI via a browser, in which case the UI is a web-based browser. In another embodiment, the administrator workstation 103 can access the management UI via a command line interface (CLI).

In one embodiment, the certificate system 120 provides a customizable profile framework to apply policies for incoming certificate requests and to control the input request types and output certificate types using the certificate profiles. The profile framework, also referred to as the enrollment profile framework is implemented by the certificate manager 125 and is used to approve and issue certificates according to the selected profile. There are two main types of certificate profiles—enrollment request profiles and renewal request profiles. Enrollment is the process for requesting and receiving an issued certificate. The mechanics for the enrollment process may depend on the type of certificate, the method for generating its key pair, and the method for generating and approving the certificate itself. Certificate enrollment, at a high level, may have the following basic steps: a user generates a certificate request and submits to the certificate system 120. The certificate system 120 verifies the request by authenticating the requesting entity and confirming that the request meets the certificate profile rules that were used to submit the request. The certificate system 120 then approves the request, and the user retrieves the new certificate. When the certificate reaches the end of its validity period (as indicated by the expiration date), the certificate system 120 can allow the expiring certificate to be renewed by receiving from a user a certificate renewal request for the certificate at the certificate manager 125. In other embodiments, the certificate system 120 may implement other types of frameworks, such as a policy-based framework that incorporates the automatic renewal module 130.

A certificate profile defines everything associated with the issuance of a particular type of certificate including the authentication method, the certificate content (defaults), constraints for values associated with that content that can be contained in this type of certificate, and the contents of the input and output forms associated with the certificate profile. Enrollments requests are submitted to the certificate system and the certificate system processes the requests according to the particular certificate profiles. The certificate system subjects the request to the defaults and constraints set up in that certificate profile whether the request is submitted via the input form associated with the certificate profile or via some other means. The certificate that is issued from a certificate profile request contains the content defined by the defaults with values derived from the values contained in the parameters associated with those defaults. The constraints provide rules for which content is allowable in the certificate, and may define allowable values for that content.

For example, the administrator could set up a certificate profile for user certificates that defines all aspects of that certificate including the validity period of the issued certificate. The administrator can set a default that defines the default validity period as two years. The administrator could also set up a constraint that the validity period for certificates issued from requests submitted to this certificate profile cannot exceed two years. When a user sends a request using the input form associated with this certificate profile, the certificate issued will contain the information specified in the defaults set up and will be valid for two years. If a user submits a pre-formatted request that requests a certificate with a validity period of four years, the request will be rejected since the constraints allow a maximum of two years validity period for this type of certificate.

In one embodiment, a set of certificate profiles have been predefined for the most common types of certificates issued. The predefined certificate profiles define defaults and constraints commonly associated with this type of certificate, associate the authentication method common for this type of enrollment, and define the needed inputs and outputs for the certificate profile. These predefined certificate profiles can be modified by the administrator, for example, by changing the authentication method, the defaults, the constraints used in each policy, the values assigned to any of the parameters in a policy, or the input and output. The administrator can also create other certificate profiles either for other types of certificates, or for creating more than one certificate profile for a particular type of certificate. For example, the administrator can create more than one certificate profile for a particular type of certificate when you want to issue the same type of certificate with either a different authentication method or different definitions for the defaults and constraints. For example, the administrator might create two certificate profiles used for enrollment for SSL Server certificates where one certificate profile issues certificates with a validity period of six months and another certificate profile issues certificates with a validity period of two years.

An input specifies how the enrollment page should be presented, and what inputs should be gathered from the end-entities. The administrator can modify the certificate profiles to use inputs to add text fields to the enrollment page so that additional information can be gathered and used for the enrollment. The input values are used as values in the certificate. The administrator can use a predefined set of inputs to create an enrollment form containing the fields needed for most certificate profiles. The inputs provide a certificate request field that can be added to any of the request forms so that certificate requests can be pasted into this field, allowing a request to be created outside the input form with any of the requested information.

An output specifies how the response page to a successful enrollment is presented to the requester. For example, the output usually displays the certificate in a user-readable format. Alternatively, the administrator can create other outputs.

In one embodiment, the administrator sets up a certificate profile by associating an existing authentication plug-in, or authentication method, with the certificate profile, enabling and configuring defaults and constraints, and defining inputs and outputs. The administrator can use the existing certificate profiles, modify the existing certificate profiles, create new certificate profiles, and delete any certificate profile that will not be used in this PKI.

In one embodiment, each of the certificate profiles can be listed in a certificate profile tab of an end-entity interface where an end-entity (e.g., a user) can enroll for a certificate using the certificate profile, for example, by selecting the certificate profile from the list of certificate profiles. In one embodiment, the certificate profile enrollment page contains links to each type of certificate profiles.

When an end entity selects one of those links, the dynamic user interface engine 130 presents an enrollment page containing an enrollment form specific to that certificate profile to the client 102. The dynamic user interface engine 130 dynamically generates the enrollment page for this certificate profile in the end-entity interface from the inputs defined for this certificate profile and the constraints. In one embodiment, the dynamic user interface engine 130 receives user input that selects one of the certificate profiles for requesting a certificate, dynamically generates an enrollment page with a profile enrollment form using the set of defaults and the set of constraints associated with the selected certificate profile, and presents the enrollment page with the profile enrollment form to a user. The set of constraints may include one or more of an extension constraint, a usage extension constraint, a key constraint, a key usage extension constraint, a renewal grace period constraint, a signing algorithm constraint, a subject name constraint, a unique subject name constraint, a validity constraint, or the like.

For example, in one embodiment, one of the constraints is a key-type constraint that specifies one or more permissible key types for a key contained in the certificate, and the dynamic user interface engine 130 dynamically generates the enrollment form to include an input mechanism to allow the user to select one of the permissible key types. In another embodiment, one of the constraints is a key-size constraint that specifies one or more permissible key-sizes for a key contained in the certificate, and the dynamic user interface engine 130 dynamically generates the enrollment form to include an input mechanism to allow the user to select one of the permissible key-sizes allowed by the certificate profile. In another embodiment, if an authentication plug-in is configured, the dynamic user interface engine 130 can add additional fields that are needed to authenticate the user with that authentication method.

In another embodiment, one of the constraints is a key-size constraint that specifies one or both of a minimum allowable key length and a maximum allowable key length for a key contained in the certificate, and the dynamic user interface engine 130 dynamically generates the profile enrollment form to include an input mechanism to allow the user to input a key length that is between the minimum and maximum key lengths. In another embodiment, one of the constraints is a signing algorithm constraint that specifies one or more permissible signing algorithms for signing the certificate, and the dynamic user interface engine 130 dynamically generates the profile enrollment form to include an input mechanism to allow the user to select one of the permissible signing algorithms. In another embodiment, when the user does not select one of the signing algorithms, the dynamic user interface engine 130 selects the best available signing algorithm that is compatible with the particular key type (e.g., Rivest, Shamir, and Adlerman (RSA) key types, Elliptic curve cryptography (ECC) key types, or the like).

The dynamic user interface engine 130 presents the enrollment form to the requester with the dynamically generated input mechanism associated with the particular constraint, such as the key-type or key-size constraints. The user selects one of the permissible key types, key sizes, or signing algorithms presented in the dynamically generated enrollment form. The dynamic user interface engine 130 receives the completed enrollment form, including the user's selection of the one or more permissible key types, key sizes, or signing algorithm for the key, and the dynamic user interface engine 130 updates the profile enrollment form with the user's selection for submission to the CS subsystem 150. The dynamic user interface engine 130 sends the completed enrollment form to the CS subsystem 150 to authenticate, authorize, and issue the certificate.

In one embodiment, the enrollment forms are Hypertext Transport Protocol (HTTP) forms. The HTTP enrollment forms may include an input field for each of the set of inputs specified in the selected certificate profile and fields for each of the set of defaults. The HTTP enrollment form may also reflect the constraints on any of the inputs. For example, the HTTP enrollment form may present only the permissible key types, key sizes, or signing algorithms that are permissible according to the constraints of the selected certificate profile. When the dynamic user interface engine 130 receives the completed HTTP form the requester, the dynamic user interface engine 130 generates an enrollment request for the certificate from the information in the HTTP form and sends the enrollment request to the CS subsystem 150 to authenticate, authorize, and issue the certificate. In one embodiment, the enrollment page presented to the requester is a web-based service page that uses Hypertext Markup Language (HTML) and JavaScript to dynamically generate the enrollment page. In one embodiment, the enrollment page is generated from a template file, and modified according to the constraints of the selected certificate profile.

In one embodiment, the CS subsystem 150 receives the request from the dynamic user interface engine 130 and authenticates, authorizes, and issues the request. For example, when the request needs to be approved by an agent, the CS subsystem 150 queues the certificate request for manual approval by an agent. The agent can change some aspects of the enrollment request, validate the request, cancel the request, reject the request, update the request, or approve the request. However, since the enrollment request has been generated based on a dynamically generated user interface by the dynamic user interface engine 130, the user is unable to request a certificate that does not comply with the constraints of the selected certificate profile. This may reduce the number of requests received by the CS subsystem 150 that violate constraints of the selected certificate profile.

In another embodiment, when a certificate profile is associated with an authentication method, the CS subsystem 150 immediately approves the request and generates a certificate automatically if the user successfully authenticates, all the information required is provided, and the request does not violate any of the constraints set up for the certificate profile. The issued certificate contains the content defined in the defaults for this certificate profile, such as the extensions and validity period for the certificate, and the content of the certificate is constrained by the constraints set up for each default. The administrator can set up more than one set of policies (defaults and constraints) within one or more profiles.

In another embodiment, the selected certificate profile is a renewal request profile, and the dynamic user interface engine 130 dynamically generates a profile renewal form using the set of defaults and the set of constraints associated with the selected renewal request profile.

FIG. 2 is a block diagram of one embodiment of the dynamic user interface engine 130 of FIG. 1. The dynamic user interface engine 130 includes an web server 232, a form generator 234, a page generator 236, a profile generator 238, a data storage device 260 that stores certificate profiles, and a data storage device 270 that stores user interface (UI) templates 270.

The following embodiment describes how the dynamic user interface engine 130 dynamically generates an enrollment page with a profile enrollment form using the set of defaults and the set of constraints associated with the selected certificate profile. The client 102 requests access to the certificate manager 125 to request or renew a certificate, and the web server 232 presents a certificate profile enrollment page containing links to each of the available certificate profiles stored in the data storage device 260. When the client 102 selects one of the links, the web server 232 dynamically generates an enrollment page with a profile enrollment form using the defaults and constraints specified in the selected certificate profile. In particular, the form generator 234 is coupled to the web server 232 to receive the user's selection. The form generator 234 accesses the data storage device to find a record of the selected certificate profile. The form generator 234 generates an enrollment form using the set of one or more defaults and the set of one or more constraints stored in the certificate profile's record. The form generator 234 dynamically generates the enrollment form by generating input fields and/or input mechanisms for the enrollment form that allow the client 102 to input and/or select only permissible values within the constraints specified by the selected certificate profile. The form generator 234 sends the dynamically generated enrollment form to the page generator 236. In response, the page generator 236 generates the enrollment page with the dynamically generated enrollment form generated by the form generator 234. In one embodiment, the page generator 236 accesses the data storage device 270 that stores the UI templates. The page generator 236 uses the UI templates to generate the enrollment page. The page generator 236 sends the enrollment page to the web server 232, which presents the enrollment page to the client 102. In another embodiment, the web server 232 can instruct the page generator 236 and form generator 234 to generate the enrollment page and enrollment form concurrently or simultaneously, and the web server 232 merges the enrollment form into the enrollment page before presenting the enrollment page to the client 102. Alternatively, other configurations are possible as would be appreciated by one of ordinary skill in the art having the benefit of this disclosure.

In one embodiment, the page generator 236 generates the enrollment page using an index html file that defines the header and menus of the enrollment page and one of the different template files stored in the data storage device 270, and one or more files for the profile enrollment forms, such as HTML files. The files for the profile enrollment forms may be dynamically modified to add mechanisms to restrict the user's input to values that are within the constraints specified in the certificate profiles. In one embodiment, the files use JavaScript to generate the pages, and an HTML markup can be edited. The profile HTML pages may use standard HTML markup with little generated content. For example, the profile files may use a mix of HTML and JavaScript to create the enrollment form or index file that is presented to the client 102.

After the client 102 has completed the enrollment form of the enrollment page presented by the web server 232, the client 102 submits the enrollment page to the web server 232. Upon receiving the completed enrollment form, the web server 232 generates an enrollment request for the certificate using the profile enrollment form and any input provided by the user in connection with the profile enrollment form. The web server 232 sends the enrollment request to the CS subsystem to authenticate, authorize, and issue the certificate.

In the depicted embodiment, the CS subsystem 150 includes servlets 252, an authentication module 253, an authorization module 254, and a certificate issuance module 256. In the depicted embodiment, once the web server 232 generates the enrollment request, the web server 232 invokes a servlet 252. In one embodiment, the servlet 252 is software code, such as Java code, that handles a particular kind of interaction with end entities or agents on behalf of the CS subsystem 150. The servlet 252 uses the authentication module 253 to authenticate the user's identity. The authentication module 253 may include a set of rules (e.g., implemented as a Java™ class) for authenticating the client 102 that needs to interact with the CS subsystem 150. The authentication module 253 can authenticate the certificate request using agent-based authentication, password-based authentication, certificate-based authentication, client authentication, server authentication, or the like. Once authenticated, the servlet 252 passes the certificate request to an authorization module 254, which determines whether the certificate request has been approved. The profile processing of the authorization module 254 determines whether to approve the certificate request.

The authorization module 254 passes the authorized request to a certificate issuance module 256, which issues the certificate accordingly. The profile processing of the certificate issuance module 256 issues the renewed certificate when the certificate request is approved and makes the renewed certificate available for retrieval by a user. In one embodiment, the certificate issuance module 256 publishes the certificate in the LDAP repository 140 via the LDAP directory server 127.

In one embodiment, one of the servlets 252 can be used to present an administrator console to the administrator workstation 103 to allow the administrator to create or modify certificate profiles stored in the data storage device 260. The administrator invokes the servlet 252, which interacts with the profile generator 238 to generate a new certificate profile or to modify an existing certificate profile. The profile generator 238 receives user input from the administrator to create or modify the certificate profiles. The administrator may also use the administrator console to manage the certificate manager 125 itself, such as for adding users, configuring logs, managing profiles and plug-ins, and the CA database, among many other functions.

The embodiments described above have been described with respect to the certificate operation of requesting a new certificate. However, the dynamic user interface engine 130 and the CS subsystem can be used to dynamically generate renewal enrollment forms and to authenticate, authorize, and issue the renewed certificate.

In another embodiment, the dynamic user interface engine 130 also includes a key-type compliance checker 238. When one of the constraints of the set is a key-type constraint, the key-type compliance checker 238 can be used to determine if the client 102 supports a specified key type. In one embodiment, before the web server 232 presents the enrollment page to the client 102, the key-type compliance checker 238 requests information from a browser of the client 102 to see if the client 102 supports the specified key type. In another embodiment, upon user selection of one of the permissible key types presented in the enrollment form, the key-type compliance checker 238 can determine if the selected key type is supported by the client 102, for example, by requesting information from the browser of the client 102. Most computing devices support RSA key types, for example, but not all computing devices support ECC key types. In another embodiment, when the enrollment form includes the ECC key type as one of the permissible key types, the web server 232 can invoke the key-type compliance checker 238 to determine if the client 102 supports ECC key types. If the client 102 does not support ECC key types, the web server 232 can remove the ECC key type from the list of permissible key types. If the client 102 does support ECC key types, then the web server 232 allows the ECC key type to be presented in the list of permissible key types. Alternatively, the key-type compliance checker 238 can remove the ECC key type from the list of permissible key types.

Figure 3A:
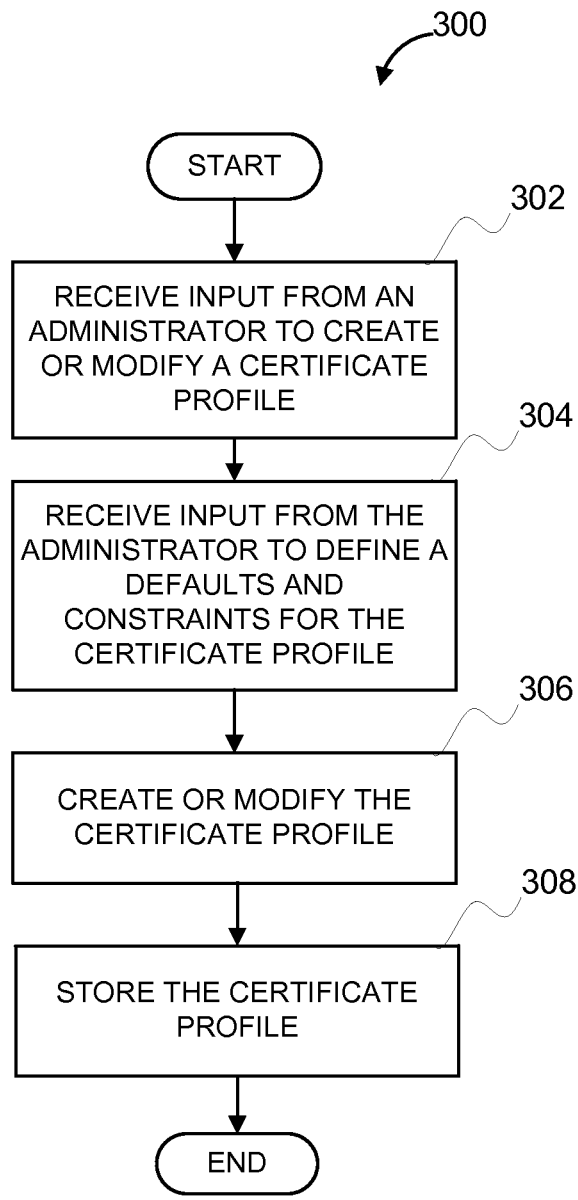
FIG. 3A is a flow diagram of one embodiment of a method of creating or modifying a certificate profile used for dynamic user interface generation.

FIG. 3A is a flow diagram of one embodiment of a method of creating or modifying a certificate profile for dynamic user interface generation. The method 300 is performed by processing logic that may comprise hardware (circuitry, dedicated logic, etc.), software (such as is run on a general purpose computer system or a dedicated machine), firmware (embedded software), or any combination thereof. In one embodiment, the certificate manager 125 of FIGS. 1 and 2 performs the method 300. In another embodiment, the profile generator 238 and the servlet 252 perform the method 300. Alternatively, other components of the certificate system 120 can perform some or all of the operations of method 300.

Referring to FIG. 3A, processing logic begins with receiving user input from an administrator to create or modify a certificate profile (block 302). Next, the processing logic receives user input from the administrator to define a set of one or more defaults and one or more constraints for values associated with the certificate's contents contained in the certificate (block 304). Next, the processing logic creates or modifies the certificate profile (block 306) and stores the certificate profile in the data storage device (block 308), and the method ends. By way of example and not limitation, the set of one or more constraints may be an extension constraint, a usage extension constraint, a key constraint, a key usage extension constraint, a renewal grace period constraint, a signing algorithm constraint, a subject name constraint, a unique subject name constraint, and a validity constraint. Alternatively, other constraints may be used as would be appreciated by one of ordinary skill in the art having the benefit of this disclosure.

Figure 3B:
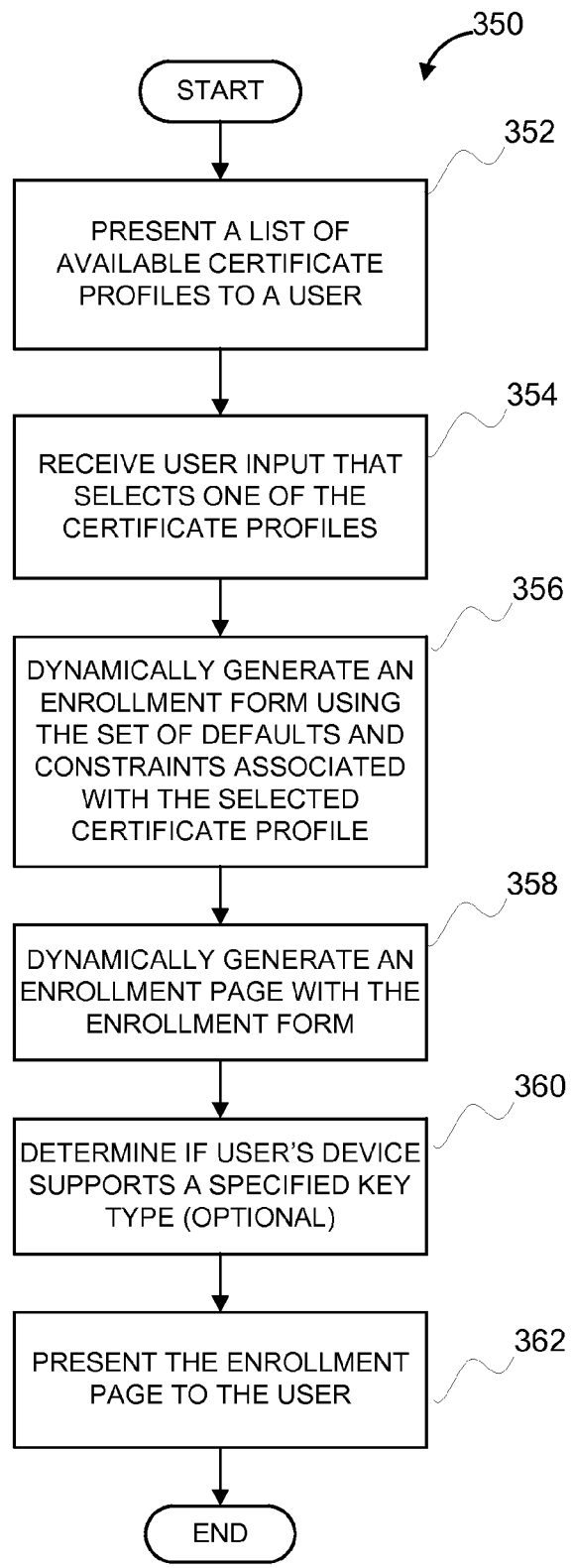
FIG. 3B is a flow diagram of one embodiment of a method of dynamic user interface generation based on constraints of a certificate profile.

FIG. 3B is a flow diagram of one embodiment of a method 350 of dynamic user interface generation based on constraints of a certificate profile. The method 350 is performed by processing logic that may comprise hardware (circuitry, dedicated logic, etc.), software (such as is run on a general purpose computer system or a dedicated machine), firmware (embedded software), or any combination thereof. In one embodiment, the certificate manager 125 of FIGS. 1 and 2 performs the method 350. In another embodiment, the dynamic user interface engine 130 and the CS subsystem 150 perform the method 350. Alternatively, other components of the certificate system 120 can perform some or all of the operations of method 350.

Referring to FIG. 3B, processing logic begins with presenting a list of available certificate profiles to a user (block 352). The processing logic can generate the list of available certificate profiles based on the certificate profiles stored in the data storage device as described above. Next, the processing logic receives user input that selects one of the certificate profiles for requesting a certificate (block 354). The selected certificate profile defines a set of one or more defaults of the certificate's contents and a set of one or more constraints for values associated with the certificate's contents contained in the certificate. Next, the processing logic dynamically generates an enrollment form using the set of defaults and the set of constraints associated with the selected certificate profile (block 356) and generates an enrollment page with the enrollment form (block 358). The processing logic presents the enrollment page to the user (block 362).

In one embodiment, when one of the constraints of the set is a key-type constraint, the processing logic dynamically generates the enrollment page by dynamically generating the profile enrollment form to include an input mechanism to allow the user to select one of the permissible key types allowed by the selected certificate profile. In one embodiment, the processing logic can be configured to determine if the user's computing device supports a specified key type associated with the certificate (block 360). In one embodiment, the processing logic allows the presenting at block 362 when the computing device supports the selected key type. Alternatively, the processing logic presents the enrollment form to the user, and receives user input that selects one of the permissible key types presented in the enrollment form. The processing logic determines if the computing device supports the selected key type and allows the presentation of the enrollment form when the computing device supports the selected key type; otherwise the processing logic excludes the ECC key type in the one or more permissible key types. In one embodiment, the processing logic determines if the computing device supports the key type by requesting information from a browser of the computing device. For example, the requested information may indicate that the computing device supports only RSA key types and not ECC key types. In such case, the processing logic can update the enrollment form to exclude ECC from the permissible key types that are presented to the user in the enrollment form. In another embodiment, the processing logic determines if the computing device supports ECC when the user input selects the ECC key type from the one or more permissible key types, or when ECC is listed as one of the permissible key types in the enrollment form. Alternatively, the processing logic can determine if the computing device supports any specified key type using other methods as would be appreciated by one of ordinary skill in the art having the benefit of this disclosure.

In another embodiment, when one of the constraints of the set is a key-size constraint, the processing logic dynamically generates the enrollment page by dynamically generating the profile enrollment form to include an input mechanism to allow the user to select one of the permissible key-sizes allowed by the selected certificate profile or to input a key length that is allowed by the selected certificate profile. The key-size constraint specifies one or more permissible key-sizes for a key contained in the certificate. In another embodiment, the key-size constraint specifies a minimum allowable key length and/or a maximum allowable key length for a key contained in the certificate.

In another embodiment, when one of the constraints of the set is a key-size constraint, the processing logic dynamically generates the enrollment page by dynamically generating the profile enrollment form to include an input mechanism to allow the user to select one of the permissible signing algorithms.

In another embodiment, the certificate profile also specifies a set of one or more inputs associated with the certificate profile, and the processing logic dynamically generates the enrollment page by dynamically generating the profile enrollment form to include an input field for each of the set of inputs.

Once the user completes the profile enrollment form, the processing logic receives the form from the user and generates an enrollment request for the certificate using information from the profile enrollment form and any input provided by the user in connection with the profile enrollment form. The processing logic sends the enrollment request to a certificate system subsystem to authenticate, authorize, and issue the certificate. In another embodiment, the processing logic can authenticate, authorize, and issue the certificate.

Figure 4:
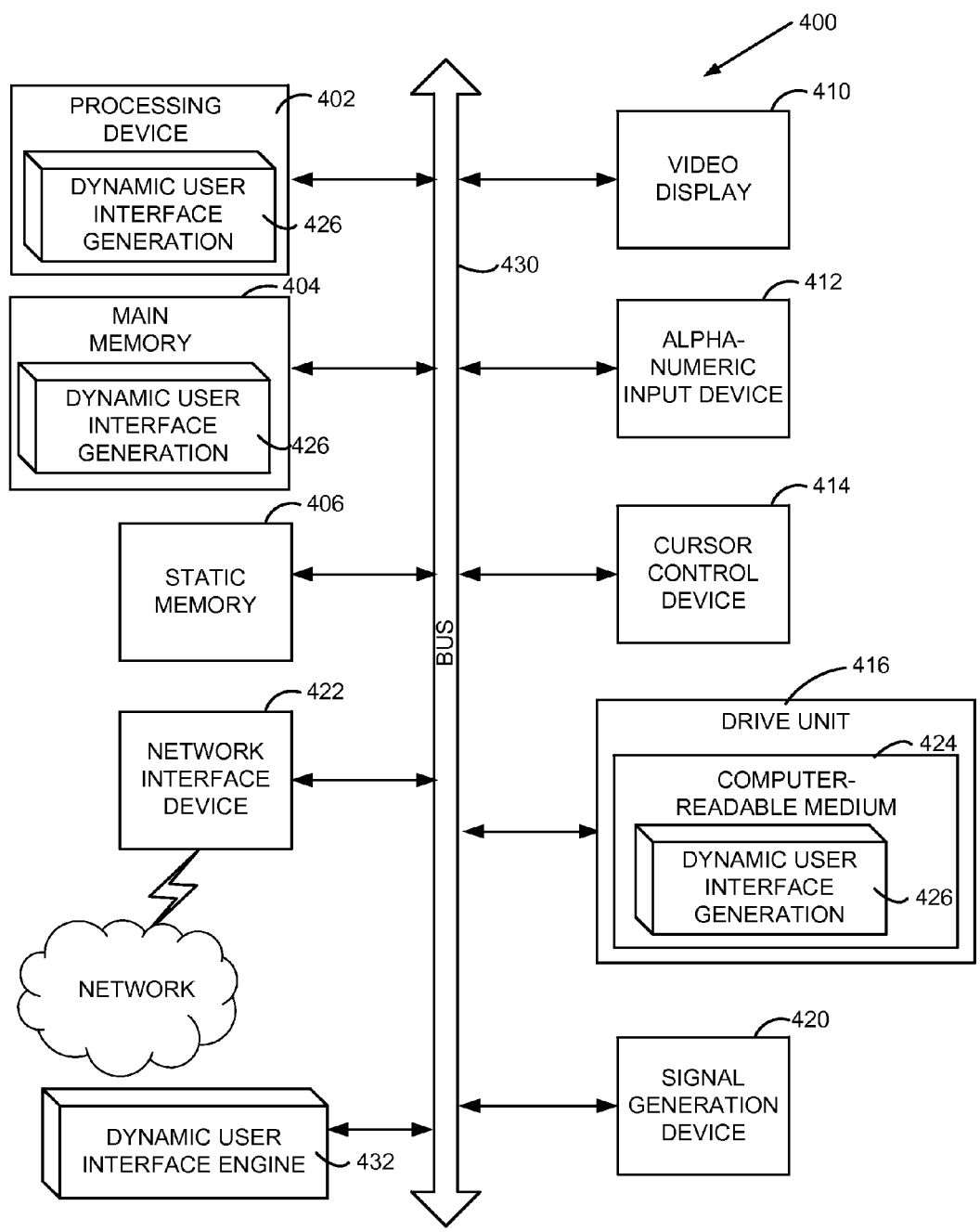
FIG. 4 illustrates a diagrammatic representation of a machine in the exemplary form of a computer system for dynamic user interface generation based on constraints of a certificate profile.

FIG. 4 illustrates a diagrammatic representation of a machine in the exemplary form of a computer system 400 for dynamic user interface generation based on constraints of a certificate profile. Within the computer system 400 is a set of instructions for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a STB, a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for operations of dynamic user interface generation based on profile constraints, such as the methods 300 and 350 described above. In one embodiment, the computer system 400 represents various components that may be implemented in the certificate system 120 as described above. Alternatively, the certificate system 120 may include more or less components as illustrated in the computer system 400.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data storage device 416, each of which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic (e.g., dynamic user interface generation 426) for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored one or more sets of instructions (e.g., dynamic user interface generation 426) embodying any one or more of the methodologies or functions described herein. The dynamic user interface generation 426 may also reside, completely or at least partially, within the main memory 404 and/or within the processing device 402 during execution thereof by the computer system 400, the main memory 404 and the processing device 402 also constituting computer-readable storage media. The dynamic user interface generation 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The dynamic user interface engine 432, components, and other features described herein (for example in relation to FIGS. 1 and 2A) can be implemented as discrete hardware components or integrated in the functionality of hardware components such as ASICS, FPGAs, DSPs or similar devices. In addition, the dynamic user interface engine 432 can be implemented as firmware or functional circuitry within hardware devices. Further, the dynamic user interface engine can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
receiving user input at a processing device that selects one of a plurality of certificate profiles for requesting a certificate, wherein each of the plurality of certificate profiles defines a set of defaults of the certificate's contents and a set of constraints for values associated with the certificate's contents contained in the certificate, wherein the set of constraints comprises a renewal grace period constraint and a key type constraint that specifies one or more permissible key types for a key contained in the certificate;
generating, by the processing device an enrollment page with a profile enrollment form using the set of defaults and the set of constraints associated with the selected certificate profile, wherein the enrollment page is a web-based service page and the enrollment form is a Hypertext Transport Protocol (HTTP) based enrollment form, and wherein the generating the enrollment page comprises:
retrieving a template file associated with the selected certificate profile for the enrollment form;
modifying the template file according to the set of constraints associated with the selected certificate profile so that a user requesting the certificate is unable to request a certificate that does not comply with the set of constraints of the selected certificate profile; and
presenting, by the processing device, the enrollment page with the profile enrollment form to the user;
responsive to the user selection of one of the key types presented in the enrollment form, sending a request for information about the key type to a browser of a client;
receiving the requested information about the selected key type from the browser of the client;
responsive to receiving the requested information about the selected key type from the browser of the client, determining whether the client supports the selected key type in view of the requested information from the browser;
receiving the profile enrollment form from the user with input provided by the user;
generating an enrollment request for the certificate using the profile enrollment form and the input provided by the user in connection with the profile enrollment form; and
sending the enrollment request to a certificate system (CS) subsystem to authenticate, authorize and issue the certificate, wherein the enrollment request complies with the set of constraints of the selected certificate profile before sending the enrollment request to the CS subsystem.

2. The method of claim 1, wherein the set of constraints further comprises an extension constraint, an usage extension constraint, a key constraint, a key usage extension constraint, a signing algorithm constraint, a subject name constraint, a unique subject name constraint, and a validity constraint.

3. The method of claim 1, wherein the set of constraints further comprises a key-type constraint that specifies one or more permissible key types for a key contained in the certificate, and wherein the generating the enrollment page comprises generating the profile enrollment form to include an input mechanism to allow the user to only select one of the permissible key types allowed by the selected certificate profile so that the user is unable to select a key type that is not one of the permissible key types allowed by the selected certificate profile.

4. The method of claim 3, further comprising receiving user input that selects one of the one or more permissible key types for the key, and wherein the generating the enrollment page comprises updating the profile enrollment form with input associated with the selected key type.

5. The method of claim 3, further comprising:
determining whether a second processing device of the user requesting the certificate supports an Elliptic curve cryptography (ECC) key type;
presenting the ECC key type in the one or more permissible key types when the second processing device supports the ECC key type; and
excluding the presenting of the ECC key type in the one or more permissible key types when the second processing device does not support the ECC key type.

6. The method of claim 1, wherein the set of constraints further comprises a key-size constraint that specifies one or more permissible key-sizes for a key contained in the certificate, and wherein the generating the enrollment page comprises generating the profile enrollment form to include an input mechanism to allow the user to only select one of the permissible key-sizes allowed by the selected certificate profile so that the user is unable to select a key size that is not one of the permissible key sizes allowed by the selected certificate profile.

7. The method of claim 1, wherein the set of constraints further comprises a key-size constraint that specifies a minimum allowable key length and a maximum allowable key length for a key contained in the certificate, and wherein the generating the enrollment page comprises generating the profile enrollment form to include an input mechanism to allow the user to only input a key length that is between the minimum and maximum key lengths so that the user is unable to input a key size that is not one of the permissible key sizes allowed by the selected certificate profile.

8. The method of claim 1, wherein the set of constraints further comprises a signing algorithm constraint that specifies one or more permissible signing algorithms for signing the certificate, and wherein the generating the enrollment page comprises generating the profile enrollment form to include an input mechanism to allow the user to only select one of the permissible signing algorithms so that the user is unable to select a signing algorithm type that is not one of the permissible signing algorithms allowed by the selected certificate profile.

9. The method of claim 1, wherein each of the plurality of certificate profiles defines a set of one or more inputs associated with the certificate profile, and wherein the generating the enrollment page comprises generating the profile enrollment form to include an input field for each of the set of inputs associated with the selected certificate profile.

10. The method of claim 9, wherein the receiving the profile enrolment form comprises receiving the profile enrollment form from the user as a Hypertext Transport Protocol (HTTP) form over a network connection at the processing device, wherein the HTTP form comprises information in the input field for each of the set of inputs associated with the selected certificate profile and fields for each of the set of defaults, and wherein the generating the enrollment form comprises generating the enrollment request for the certificate from the information in the HTTP form.

11. The method of claim 1, wherein the selected certificate profile is a renewal request profile, and wherein the generating the enrollment page comprise generating a profile renewal form using the set of defaults and the set of constraints associated with the selected renewal request profile.

12. The method of claim 1, wherein the web-based service page uses Hypertext Markup Language (HTML) and JavaScript to generate the enrollment page.

13. The method of claim 1, further comprising receiving input from an administrator to modify or create at least one of the plurality of certificate profiles.

14. A method comprising:
receiving user input at a first processing device that selects one of a plurality of certificate profiles for requesting a certificate, wherein each of the plurality of certificate profiles defines a set of defaults of the certificate's contents and a set of constraints for values associated with the certificate's contents contained in the certificate, wherein the set of constraints comprises a key-type constraint that specifies one or more permissible key types for a key contained in the certificate and a renewal grace period constraint;
determining, by the first processing device, whether a second processing device of the user requesting the certificate supports the one or more permissible key types;
generating, by the first processing device, an enrollment page with a profile enrollment form using the set of defaults and the set of constraints associated with the selected certificate profile, wherein the generating the enrollment page comprises generating the profile enrollment form to include an input mechanism that only displays the key types that are supported by the second processing device so that a user requesting the certificate is unable to request a key type that is not supported by the second processing device;
presenting, by the first processing device, the enrollment page with the profile enrollment form to the user;
responsive to the user selection of one of the key types presented in the enrollment form, sending a request for information about the key type to a browser of a client;
receiving the requested information about the selected key type from the browser of the client;
responsive to receiving the requested information about the selected key type from the browser of the client, determining whether the client supports the selected key type in view of the requested information from the browser;
receiving the profile enrollment form from the user with input provided by the user;
generating an enrollment request for the certificate using the profile enrollment form and the input provided by the user in connection with the profile enrollment form; and
sending the enrollment request to a certificate system (CS) subsystem to authenticate, authorize and issue the certificate, wherein the enrollment request complies with the set of constraints of the selected certificate profile before sending the enrollment request to the CS subsystem, and wherein the enrollment request specifies a selection of one of the key types that are supported by the second processing device before sending the enrollment request to the CS subsystem.

15. The method of claim 14, wherein the determining whether the second processing device supports the one or more permissible key types comprises:
determining whether the second processing device of the user requesting the certificate supports an Elliptic curve cryptography (ECC) key type;
presenting the ECC key type in the one or more permissible key types when the second processing device supports the ECC key type; and
excluding the presenting of the ECC key type in the one or more permissible key types when the second processing device does not support the ECC key type.

16. A certificate system, comprising:
a data storage device to store records of a plurality of certificate profiles, wherein each of the plurality of certificate profiles defines a set of defaults of a certificate's contents and a set of constraints for values associated with the certificate's contents contained in the certificate, wherein the set of constraints comprises a renewal grace period constraint and a key type constraint that specifies one or more permissible key types for a key contained in the certificate; and
a certificate manager, coupled to the data storage device, to receive user input that selects one of the plurality of certificate profiles for requesting a certificate, to generate an enrollment page with a profile enrollment form using the set of defaults and the set of constraints associated with the selected certificate profile, and to present the enrollment page with the profile enrollment form to a user at a client, wherein the enrollment page is a web-based service page and the enrollment form is a Hypertext Transport Protocol (HTTP) based enrollment form, and wherein the certificate manager is to generate the enrollment page by:
retrieving a template file associated with the selected certificate profile for the enrollment form;
modifying the template file according to the set of constraints associated with the selected certificate profile so that a user requesting the certificate is unable to request a certificate that does not comply with the set of constraints of the selected certificate profile, and
wherein the certificate manager is further to:
receive the profile enrollment form from the user with input provided by the user;
generate an enrollment request for the certificate using the profile enrollment form and the input provided by the user in connection with the profile enrollment form;
send the enrollment request to a certificate system (CS) subsystem to authenticate, authorize and issue the certificate, wherein the enrollment request complies with the set of constraints of the selected certificate profile before sending the enrollment request to the CS subsystem;
and wherein the key type constraint is checked at the client by:

responsive to a user selection of one of the key types presented in the enrollment form, sending a request for information about the key type to a browser of the client;

receiving the requested information about the selected key type from the browser of the client; and responsive to receiving the requested information about the selected key type from the browser of the client, determining whether the client supports the selected key type in view of the requested information from the browser.

17. The certificate system of claim 16, wherein the certificate manager comprises:

a dynamic user interface engine to receive the user input that selects the selected certificate profile, to present a dynamically-generated enrollment page; and the CS subsystem coupled to receive the enrollment request from the dynamic user interface engine and to authenticate, authorize, and issue the certificate.

18. The certificate system of claim 17, wherein the dynamic user interface engine comprises:

a web server to receive the user input that selects one of the plurality of certificate profiles;

a form generator coupled to receive the user input from the web server, to access the data storage device to find the record of the selected certificate profile, and to generate the enrollment form using the set of one or more defaults and the set of constraints in the record; and a page generator coupled to receive the enrollment form from the form generator and to generate the enrollment page, wherein the web server is to present the enrollment page to the user after the enrollment page is generated by the page generator.

19. The certificate system of claim 17, wherein the set of constraints further comprises a key-type constraint that specifies one or more permissible key types for a key contained in the certificate, and wherein the dynamic user interface engine is to generate the profile enrollment form to include an input mechanism to allow the user to only select one of the permissible key types so that the user is unable to select a key type that is not one of the permissible key types allowed by the selected certificate profile.

20. The certificate system of claim 17, wherein the set of constraints further comprises a key-size constraint that specifies one or more permissible key-sizes for a key contained in the certificate, and wherein the dynamic user interface engine is to generate the profile enrollment form to include an input mechanism to allow the user to only select one of the permissible key-sizes so that the user is unable to select a key size that is not one of the permissible key sizes allowed by the selected certificate profile.

21. The certificate system of claim 16, wherein the certificate manager comprises a profile generator to receive input from an administrator to modify or create at least one of the plurality of certificate profiles.

22. A non-transitory machine-readable storage medium having instructions, which when executed, cause a processing device to execute operations comprising:

receiving user input that selects one of a plurality of certificate profiles for requesting a certificate, wherein each of the plurality of certificate profiles defines a set of one or more defaults of the certificate's contents and a set of constraints for values associated with the certificate's contents contained in the certificate, wherein the set of constraints comprises a renewal grace period constraint and a key type constraint that specifies one or more permissible key types for a key contained in the certificate;

generating, by the processing device, an enrollment page with a profile enrollment form using the set of defaults and the set of constraints associated with the selected certificate profile, wherein the enrollment page is a web-based service page and the enrollment form is a Hypertext Transport Protocol (HTTP) based enrollment form, and wherein the generating the enrollment page comprises:

retrieving a template file associated with the selected certificate profile for the enrollment form;

modifying the template file according to the set of constraints associated with the selected certificate profile so that a user requesting the certificate is unable to request a certificate that does not comply with the set of constraints of the selected certificate profile; and presenting, by the processing device, the enrollment page with the profile enrollment form to the user at a client;

receiving the profile enrollment form from the user with input provided by the user;

generating an enrollment request for the certificate using the profile enrollment form and the input provided by the user in connection with the profile enrollment form;

sending the enrollment request to a certificate system (CS) subsystem to authenticate, authorize and issue the certificate, wherein the enrollment request complies with the set of constraints of the selected certificate profile before sending the enrollment request to the CS subsystem;

and wherein the key type constraint is checked at the client by:

responsive to a user selection of one of the key types presented in the enrollment form, sending a request for information about the key type to a browser of the client;

receiving the requested information about the selected key type from the browser of the client; and responsive to receiving the requested information about the selected key type from the browser of the client, determining whether the client supports the selected key type in view of the requested information from the browser.

23. The machine-readable storage medium of claim 22, wherein the set of constraints further comprises a key-type constraint that specifies one or more permissible key types for a key contained in the certificate, and wherein the generating the enrollment page comprises generating the profile enrollment form to include an input mechanism to allow the user to only select one of the permissible key types so that the user is unable to select a key type that is not one of the permissible key types allowed by the selected certificate profile.

24. The machine-readable storage medium of claim 22, wherein the set of constraints further comprises a key-size constraint that specifies one or more permissible key-sizes for a key contained in the certificate, and wherein the generating the enrollment page comprises generating the profile enrollment form to include an input mechanism to allow the user to only select one of the permissible key-sizes so that the user is unable to select a key size that is not one of the permissible key sizes allowed by the selected certificate profile.

25. The machine-readable storage medium of claim 22, wherein each of the plurality of certificate profiles defines a set of one or more inputs associated with the certificate profile, and wherein the generating the enrollment page comprises generating the profile enrollment form to include an input field for each of the set of inputs associated with the selected certificate profile.

* * * * *